United States Patent [19]

Sumal

[11] Patent Number: 4,555,937
[45] Date of Patent: Dec. 3, 1985

[54] METHOD FOR MEASURING THE FLOW RATE OF PULSATING MEDIUM HAVING A BACKFLOW

[75] Inventor: Jaihind S. Sumal, Vaihingen-Ensingen, Fed. Rep. of Germany

[73] Assignee: Robert Bosch GmbH, Stuttgart, Fed. Rep. of Germany

[21] Appl. No.: 483,992

[22] Filed: Apr. 11, 1983

[30] Foreign Application Priority Data

Aug. 19, 1982 [DE] Fed. Rep. of Germany ....... 3230829

[51] Int. Cl.$^4$ .......................................... G01M 15/00
[52] U.S. Cl. ........................................ 73/118; 73/204
[58] Field of Search ................... 73/118 A, 202, 204, 73/118 G; 123/480, 483, 486

[56] References Cited
U.S. PATENT DOCUMENTS

| | | | |
|---|---|---|---|
| 4,264,961 | 4/1981 | Nishimura et al. | 73/204 |
| 4,275,695 | 6/1981 | Bauer et al. | 123/486 |
| 4,279,146 | 7/1981 | Wessel et al. | 73/118 A |
| 4,404,864 | 9/1983 | Yamauchi et al. | 73/118 A |
| 4,449,397 | 5/1984 | Lauterbach | 73/118 A |
| 4,457,167 | 7/1984 | Sumac | 73/118 A |
| 4,463,601 | 8/1984 | Rask | 73/202 |
| 4,468,963 | 9/1984 | Schäuble | 73/204 |

*Primary Examiner*—David L. Lacey
*Attorney, Agent, or Firm*—Edwin E. Greigg

[57] ABSTRACT

A method is proposed for measuring the flow rate of the pulsating air mass aspirated by an internal combustion engine when there is a backflow. To this end, an integration process in one direction is initiated at a zero passage of the flow rate measurement value ($U_S$) of the air flow rate measuring device at a given time, which indicates the beginning of the backflow; this integration process is continued until a subsequent zero passage occurs. Directly thereafter, an integration process in the opposite direction is initiated, which is terminated at a time when the latter integration value returns to zero. During the first integration process the flow rate measurement value ($U_S$) is set to the value of zero and is not deregulated until the termination of the second integration process, so that it then jumps to a value which is subtracted from the flow rate measurement value, and the result is a flow rate measurement value from which the backflow has been excluded.

2 Claims, 4 Drawing Figures

METHOD FOR MEASURING THE FLOW RATE OF PULSATING MEDIUM HAVING A BACKFLOW

BACKGROUND OF THE INVENTION

The invention is based on a method for measuring the flow rate of a pulsating medium having a backflow, in particular the air aspirated by an internal combustion engine, as generally defined hereinafter. When known flow rate measuring devices are used to measure the air aspirated by internal combustion engines, the pulsation in the aspirated air, which may be quite pronounced in certain operating ranges of the engines, causes an error in the measurement signal resulting from the fact that reversals in the flow occur but are not recognized as such by the air flow rate measuring device. In such flow rate measuring devices, the measurement of the flow rate is therefore interrupted when there are very high pulsation amplitudes; however, this is not a satisfactory solution, because it does not bring about a correction of or compensation for the pulsation error.

OBJECT AND SUMMARY OF THE INVENTION

The method according to the invention has the advantage over the prior art in that an error in the flow rate measurement value $U_S$ resulting from the backflow of the pulsating medium is correctable, so that it is possible to ascertain an exact flow rate measurement value $U_S$.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
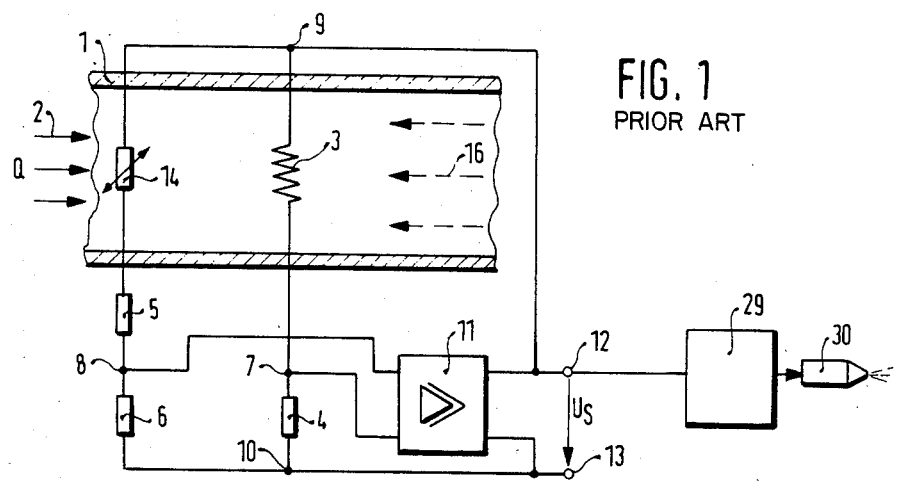
FIG. 1 is a circuit diagram of an apparatus for measuring the mass of a pulsating medium.

In FIG. 1, a flow cross section 1 is shown, for instance an air intake tube of an internal combustion engine (not shown), through which a medium flows in the direction of the arrows 2, for example the air aspirated by the engine. A temperature-dependent measuring resistor 3 is located in the flow cross section 1 and is part of a flow rate measuring device, embodied by way of example as a hot-film resistor or as a hot wire, which experiences the flow through it of the output variable of a regulator and simultaneously furnishes the input variable for the regulator. The temperature of the temperature-dependent measuring resistor 3 is adjusted by the regulator to a fixed value which is above the average temperature of the medium. If the flow speed, that is, the mass of the medium (having a flow rate value Q) flowing per unit of time increases, then the temperature-dependent measuring resistor 3 cools down to an increased extent. This cooling is fed back to the input of the regulator, causing the regulator to increase its output variable such that the fixed temperature value is again established at the temperature-dependent measuring resistor 3. The output varable of the regulator, therefore, regulates the temperature of the temperature-dependent resistor 3 to a pre-specified value at a given time when there are changes in the flow rate value Q of the medium and simultaneously represents a standard for the flowing mass of the medium, which can be supplied in the form of a flow rate measurement value $U_S$ to a metering circuit of an internal combustion engine in order to adapt the required mass of fuel to the mass of air aspirated per unit of time.

The temperature-dependent measuring resistor 3 is disposed in a resistance measuring circuit, for example a bridge circuit, and together with a resistor 4 forms a first bridge branch, parallel to which is a second bridge branch made up of the two fixed resistors 5 and 6. The pickup point 7 is located between the resistors 3 and 4, and the pickup point 8 is located between the resistors 5 and 6. The two bridge branches are connected in parallel at points 9 and 10. The diagonal voltage which appears between point 7 and 8 is carried to the input of an amplifier 11, to the output terminals of which points 9 and 10 are connected, so that its output variable supplies the bridge with operating voltage or current. The flow rate measurement value $U_S$ simultaneously acting as a manipulated variable can be picked up between the terminals 12 and 13, as indicated.

The temperature-dependent measuring resistor 3 is heated by the current flowing through it up to a value at which the input voltage of the amplifier 11, that is, the bridge diagonal voltage, becomes zero or assumes a predetermined value. A specific current then flows from the output of the amplifier into the bridge circuit. If as a result of changes in the mass Q of the flowing medium, the temperature of the temperature-dependent measuring resistor 3 then changes, then the voltage at the bridge diagonal changes and the amplifier 11 regulates the bridge supply voltage or the bridge current to a value for which the bridge is again balanced or is imbalanced in a prespecified manner. The output variable of the amplifier 11, that is, the manipulated variable $U_S$, like the current in the temperature-dependent measuring resistor 3, represents a flow rate measurement value for the flowing mass of the medium, for example the mass of air aspirated by an internal combustion engine.

In order to compensate for the influence of the temperature of the medium on the result of measurement, it may be advantageous to incorporate a second temperature-dependent resistor 14, which experiences the flow of the medium around it, in the second bridge branch. The size of the resistors 5, 6 and 14 should then be selected such that the power loss of the temperature-dependent resistor 14 which is generated by the branch current flowing through it is so small that the temperature of this resistor 14 virtually does not vary with changes in the bridge voltage but instead always corresponds to the temperature of the medium flowing past it.

Flow rate measuring devices which do not recognize the flow direction of the flowing medium, such as thermal flow rate measuring devices corresponding to the embodiment shown in FIG. 1, make a measurement error when there is a reversal in the flow of the pulsating medium such as is indicated by the arrows 16 in FIG. 1, because the backflowing mass of medium 16 is not subtracted from the flow rate measurement value but instead is added to it again. This error in the flow rate measurement value $U_S$ is particularly high in the case of pulsating flows having a high pulsation frequency and small flow rate values Q. In internal combustion engines, a reversal in the flow direction of the aspirated air, or in other words a backflow, occurs in the intake tube only after the throttle valve has been almost completely opened, that is, at full load; or in other words, it occurs only in the vicinity of the maximum average flow rate value for a given rpm of the engine.

Figure 2:
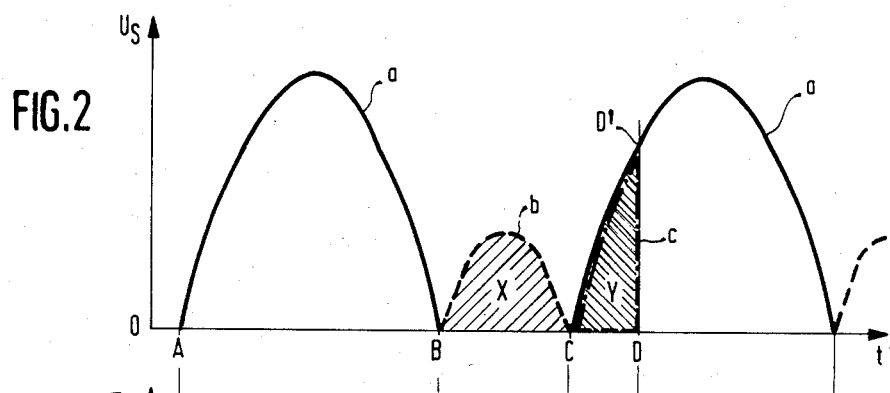
FIG. 2 is a diagram showing the course of the flow rate measurement value $U_S$ over the time t.

In FIG. 2, the course of the actual flow rate measurement value $U_S$ furnished by the flow rate measuring device is shown plotted over time by way of example. There is no flow of the medium at point A; the flow rate measurement value $U_S$ is zero. If a pulsating flow of the medium then begins in the direction indicated by the arrows 2, for example during the intake stroke of the engine, then the result is a course of the flow rate measurement value $U_S$ indicated by the solid line a, where the flow rate measurement value has dropped back to zero at point B, because at that point the backflow has begun; the backflow is indicated by the dashed line b and extends until the next zero passage at the end C of the backflow. Following the zero passage at point C, the medium again flows in the desired direction corresponding to the arrows 2, and the result then is a curve course as indicated by the solid line a. Since thermal flow rate meters do not recognize a backflow of the medium in the direction of the arrows 16, the mass of medium flowing between points B and C, which corresponds to the shaded area marked x below the line b, is incorrectly added to the flow rate value and thus causes an error in measurement.

Figure 3:
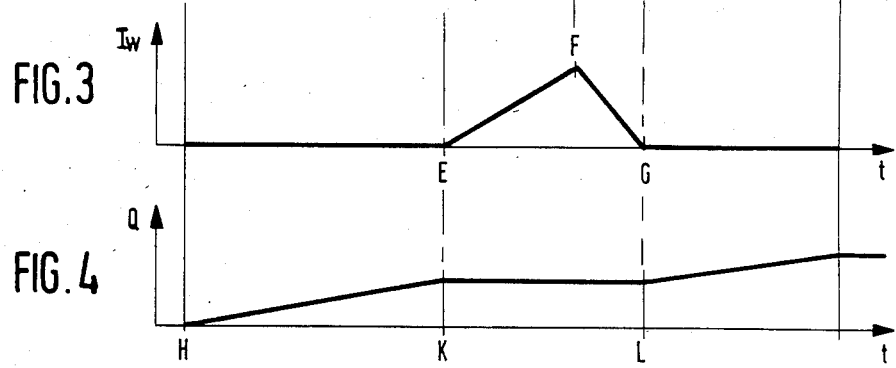
FIG. 3 is a diagram showing the course of an integration value Iw over the time t.

If a flow rate measuring device of this kind is used to ascertain the mass of air aspirated by an internal combustion engine, the flow rate measuring device thus indicates a larger aspirated air mass than was in fact aspirated by the engine. This means that a quantity of fuel which has been associated by means of an electronic control unit 29 with an excessively large measured air mass will produce an overly rich fuel-air mixture. By means of the electronic control unit 29, at least one fuel injection valve 30, by way of example, is triggered (see FIG. 1). In order to avoid this error, it is provided in accordance with the invention that with the onset of the backflow 16 at point B, an integration process is initiated, as shown in FIG. 3 in which the integration value Iw is plotted over the time t, which is effected from an initial integration value E up to a final integration value F at the end C of the backflow 16 in one direction. An integration process of such a kind can be performed in a known manner, for instance by charging a capacitor. At the end of the backflow process at point C, directly following the integration process from E to F, another integration process is initiated in the opposite direction, extending from point F, at which the final integration value F is located, to point G, at which the initial integration value has again been attained. The integration processes from E to F and from F to G may likewise be performed digitally in a known manner. Various methods have already been proposed for fixing the points B and C at which the backflow of the medium in the direction of the arrows 16 begins and ends, respectively. For instance, the zero passages of the curves a and b may be used to this end, or sensors (for pressure or temperature, for instance) which respond to the flow direction may be disposed in the flow.

Figure 4:
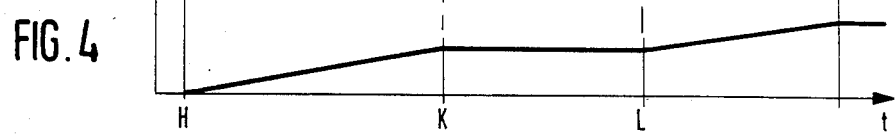
FIG. 4 is a diagram showing the course of the flow rate value Q of the medium over the time t.

The course of the flow rate value Q of the medium is plotted over time t in FIG. 4. The flow rate value Q increases, corresponding to the area shown below the curve a between points A and B, from the value at point H to a value at point K. Simultaneously with the zero passage of the flow rate measurement value $U_S$ at point B and the beginning of the integration process from E to F, the flow rate measurement value $U_S$ is set in accordance with the invention to the value of zero and is not deregulated once again until point D, at which the integration process from F to G in the opposite direction has ended. The flow rate value Q thus does not vary between points K and L in FIG. 4. At the end of the zero setting at point D, the flow rate measurement value $U_S$ then jumps to the value D' of the actual flow rate measurement value. As a result, the area y enclosed inside the dot-dash line c between points C, D and D', which has the same surface area as the area x, is subtracted from the flow rate measurement value $U_S$, and a flow rate measurement value $U_S$ which represents only the mass of medium Q flowing in the desired flow direction 2 is thus furnished.

As a result of the correction of the actual flow rate measurement value $U_S$ in accordance with the invention, an error in measurement on the part of the flow rate measuring device is prevented whenever there is a reversal of the flow.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. In a method for measuring the flow of a pulsating medium having a backflow aspirated by an internal combustion engine in a flow cross section of an air intake tube by means of a flow rate measuring device which determines the relationship between a flow rate value Q of the medium and a flow rate measurement value $U_S$ of said measuring device, and for correcting the flow rate measuremeant value $U_S$ due to backflow, comprising the improved steps of, regulating said flow rate measurement value $U_S$ to a given value at the onset of a backflow of said pulsating medium, integrating said measurement value in one direction during said backflow to a final value occurring at the end of said backflow, integrating in an opposite direction from said final value said measurement value to said given value, and deregulating said measurement value at the end of said opposite direction integrating step to said given value.

2. A method according to claim 1, wherein said measurement value $U_S$ is regulated to zero.

* * * * *